May 4, 1965

S. PATT 3,181,289

LAWNMOWER

Filed Aug. 28, 1963

INVENTOR.
SYLVESTER PATT
BY
ELY, PEARNE & GORDON
ATTORNEYS

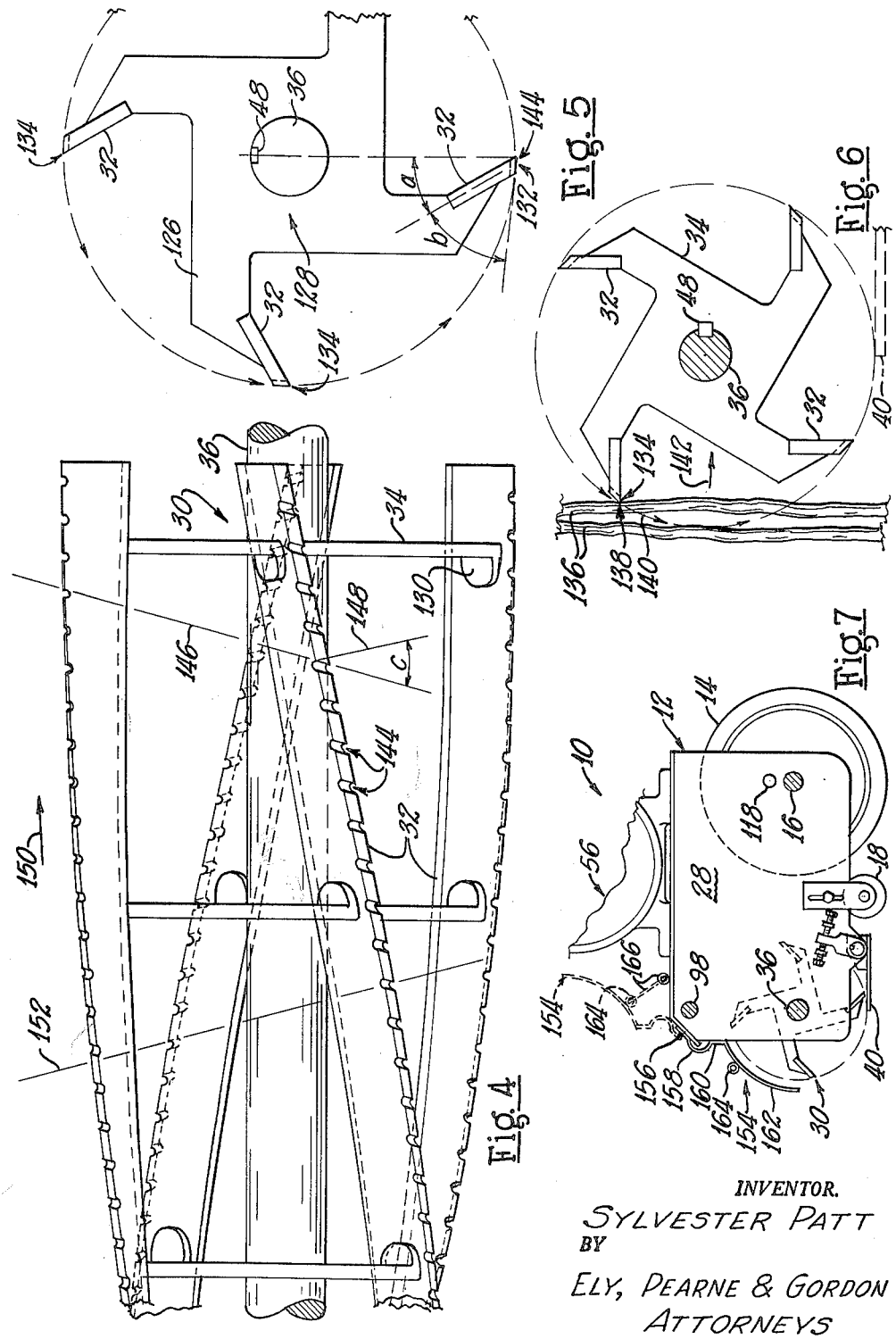

3,181,289
LAWNMOWER
Sylvester Patt, 37645 Vine St., Willoughby, Ohio
Filed Aug. 28, 1963, Ser. No. 305,044
4 Claims. (Cl. 56—294)

This invention relates to improvements in reel and cutter bar-type lawnmowers, commonly called "reel-type mowers," and more particularly relates to a reel-type lawnmower characterized by a novel configuration and location of the reel whereby the mower is rendered capable of cutting high standing materials at a high level and then at a low level with a dual cutting action.

*The problem*

As is well known, lawnmowers of the reel-type do a superior job of cutting lawn grasses because they can be adjusted to cut shorter and leave a smoother trimmed surface. This comparison is made with lawnmowers of a rotary-type, utilizing a whirling blade to engage the standing grasses or weeds near the base of the stem and thereby sever them. The latter type of machine, while capable of severing high materials quite well, is nevertheless characterized by the fault that it leaves a much rougher finished surface, not particularly desirable for formal lawns, and cannot cut the grass very short without danger of "scalping" the turf on humps or hummocks.

It is further known that mowers of the reel-type as heretofore manufactured have been characterized by the inability to cut all of the high standing foliage. Instead, the reel-type mower simply knocks down and runs over extra high foliage, such as tall dandelion blossom stems and other tall weeds.

Accordingly, a substantial advance in the art would be provided by a reel-type mower capable of uniformly cutting both low and high standing foliage in a single pass.

It is therefore, an important object to provide a reel-type lawnmower which includes an improved reel structure and location whereby tall grasses, weeds, and other high standing foliage can be effectively cut in a single pass.

Other objects of this invention will appear in the following description and appended claims, reference being had to the accompanying drawings forming a part of this specification wherein like reference characters designate corresponding parts in the several views.

FIGURE 4 is an enlarged fragmentary elevational view of the novel reel of invention;

FIGURE 5 is a fragmentary end elevational view of FIGURE 4;

FIGURE 6 is a schematic view showing the mower in action; and

FIGURE 7 is a somewhat schematic view taken along the line 7—7 of FIGURE 1 and illustrating the manner in which a guard is applied to the front of the machine of invention.

Figures 1, 2, 3:
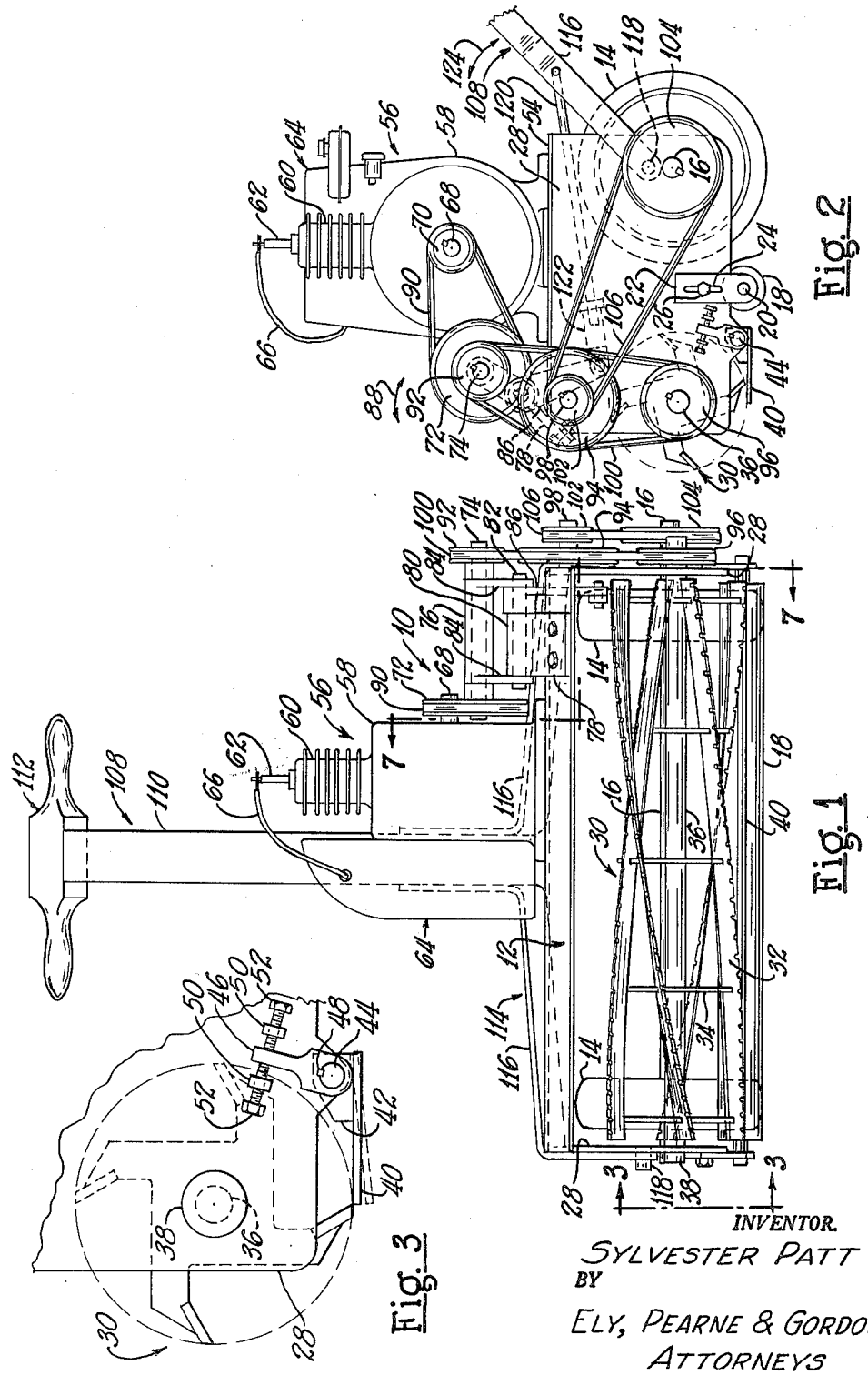
FIGURE 1 is a front elevational view of a lawnmower embodying the present invention.
FIGURE 2 is a right hand side elevational view of FIGURE 1.
FIGURE 3 is an enlarged fragmentary elevation along line 3—3 of FIGURE 1 illustrating mechanism for adjusting the cutter bar.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*The environment*

Referring now to FIGURES 1 and 2, the environment of the invention comprises a reel-type mower having the reel positioned at the front of the mower where it is fully exposed directly and without obstruction to the foliage to be cut. Accordingly it can, as will become evident, sever high standing foliage, i.e., much higher foliage than could be cut with the reel-type mowers heretofore known.

The mower, designated by the reference numeral 10, includes a frame 12 upon which the various components are supported. These components include a pair of propulsion wheels 14, shown best at the right hand side of FIGURE 2, mounted on a pair of frame side plates 28 in a rear position on the machine. It will be understood, of course, that suitable drive dogs (not shown) are included in the driving mechanism of the hub of each drive wheel 14 so that the machine will free wheel relative to the motor at such times that the motor is not operating, to permit maneuvering the machine by hand into and out of storage positions. A shaft 16 extends between wheels 14 to support them.

A roller 18 that is vertically adjustable to control the cutting height is rotatably journaled forwardly of the drive wheels 14 and is mounted on a shaft 20, carried within vertically adjustable brackets 22. Brackets 22 are plate-like elements with holes at the bottom end to receive the ends of shaft 20; and elongated slots 24 in the upper part to receive securing bolts 26. It will be evident that, with the bolts 26 loosened, the position of brackets 22 can be readily established, whereupon the bolts are retightened and the cutting height determining position of the roller 18 thereby fixed.

*The reel*

At the forward end of the side plates 28 of frame 12 is located the reel, designated generally at this point by numeral 30. The reel 30 includes a plurality, in this instance 4, cutting blades 32, each being established in a spiral manner along the length of the reel, at the cylindrical surface or cylinder of revolution generated by operation or rotation of the reel. The blades 32 are supported by radially extending web members 34 from a central and coaxial, rotatable shaft 36 that comprises a part of the reel and rotates in driving relation therewith. The shaft 36 is longer than the blades 32 to provide projections at the ends for mounting. This is illustrated by the left hand side of FIGURE 1 wherein the projecting left end of shaft 36 is fitted within a bearing 38. Such bearing 38 is carried by the frame side plate 28 and is suitably of the anti-friction or ball-bearing type.

At the right side of FIGURE 1, the shaft 36 of the reel 30 projects a slightly greater distance to carry a drive pulley which will be discussed further hereinafter relative to the drive train of the machine.

*The cutter bar*

It should be pointed out at this time that a cutter bar 40, best shown in FIGURES 2 and 3, is pivotally mounted adjacent the bottom edge of side plates 28 to coact with the blades 32 of the reel, with a unique double cutting or chopping and shearing action, as will be described later. By referring to FIGURE 3, one can best observe the manner in which cutter bar 40 is pivotally mounted and adjustably tiltable for proper engagement of the reel blades 32. As there shown, at the back edge of the cutter bar 40 and at each end thereof, there is provided as by welding, a support block 42. From each block 42 projects a short stub shaft 44. Stub shafts 44 extend respectively through appropriate bearing apertures in plates 28, and on the exposed ends are secured adjusting arms 46. These are fitted by an appropriate bore onto a stub shaft 44 and locked in place by a key 48. Lugs 50 are fastened as by welding to the outside of each plate 28 and are drilled and tapped to receive adjusting bolts 52, as evident from FIGURE 3. The bolts 52 bear against each side of adjusting arm 46. These suitably have a lock threaded interrelationship with lug 50 so that once set, they stay in position, but can be reset as necessary, commensurate with cutter bar and reel wear during use of the mower.

The prime mover and power train

Suitably secured, as by bolting to a top plate 54 of frame 12, is an internal combustion engine 56. This includes a crankcase 58, cylinder 60, spark plug 62 and fan housing and dynamo assembly 64, capable of producing electricity that is directed to plug 62 by means of lead wire 66. It is to be noted at this point that the prime mover is illustrative and might include an electric motor or other type of prime mover.

At the right hand side of the motor, as viewed in FIGURE 1, there projects a power-take-off shaft 68; in the usual instance comprising a projecting end of the engine crankshaft. As shown in FIGURE 2, a drive pulley 70 is keyed to shaft 68 in alignment with an idler pulley 72. The idler pulley 72, as best shown in FIGURE 1, is mounted on the left hand end of idler shaft 74 carried within a pivotally mounted rocker arm assembly 76. The pivotal mounting of the rocker arm assembly 76 includes a base plate 78, bolted or otherwise secured to the top plate 54. Plate 78 has an enlarged boss 80 that is bored to receive a pivot shaft 82 upon which laterally spaced arms 84 of the rocker assembly 76 are carried and locked relative to rotation therewith as by keys, not shown.

As shown in FIGURE 1, between the right hand end of the boss 80 and the rightmost arm 84, is an activating arm 86, also shown in dotted outline in FIGURE 2. This is also locked to shaft 82 so that movement of the activating arm 86 is effective to pivotally move the rocker assembly 76 in the double headed arrow direction 88 of FIGURE 2. This action will be effective to tension the belt 90 that laps the drive pulley 70 of the engine and idler pulley 72 carried by idler shaft 74, in turn supported within the rocker assembly 76.

Note that all pulleys are fastened to their respective shafts in a workman-like manner as by a locking key, suitably of the Woodruff or straight bar type.

Continuing further now with the description of the power train, the right hand end of idler shaft 74 carries a power transmitting pulley 92. This pulley is in radial alignment with an idler pulley 94 and a drive pulley 96 for the reel 30, the latter being carried on the exposed right hand end of the reel shaft 36. The idler pulley 94 is mounted upon a short jack shaft 98, projecting from a bearing, not shown, but carried by the frame side plate 28. A single V-belt 100 wraps power pulley 92, idler pulley 94 and reel drive pulley 96. Note that rocking of assembly 76 will be effective to slack or disengage the belt 90 as well as the transmission belt 100, thus providing an effective clutch and declutch of the machine as desired or necessary.

The drive wheel propulsion train

Also attached to jackshaft 98 in axial alignment with idler pulley 94 is a drive pulley 102, radially aligned with power-receiving pulley 104, locked upon the exposed right hand end of the shaft 16, carrying the drive wheels 14. A V-belt 106 wraps pulleys 102 and 104 to provide a driving connection to the wheels 14 for propelling the machine in a forward manner for the cutting operation, simultaneously with driving rotation of the reel 30.

The clutch-declutch mechanism

Continuing to refer to FIGURES 1 and 2, the machine includes a guiding handle assembly 108, including an elongated body member 110, extending between hand grip 112 and a connecting yoke 114, at the lower end. The yoke assembly 114 suitably includes metal straps 116 with right angle bends so that the upper ends embrace the sides of the body member 110. The bottom ends fit upon short pivot stub shafts 118, by means of appropriate apertures for the purpose. Because of the pivotal mounting at its lower end, it will be observed that the handle assembly is adapted for up and down rocking movement. Advantage is taken of this movement to clutch and declutch the engine 56 to or from driving relation with the power train and accordingly propulsion and operating of the machine. For the purpose, a connecting link or rod 120, best shown in FIGURE 2, extends between a pivotal connection at its rear end with the left hand metal strap 116 of handle assembly 108 and at its forward end is adjustably embraced by a connector 122. The connector 122 is pivotally mounted at its forward end to the previously mentioned activating arm 86. It will be observed that downward movement of the handle assembly 108 in the arrow direction 124 will be effective to rock the assembly 76 in a counterclockwise direction and tension the belt 90, at the same time tensioning belt 100 as previously described to set the machine in motion. It will further be observed that upward movement of handle assembly 108 will be effective to move rocker assembly 76 in a clockwise manner to slacken the belt 90 and stop the action of the machine.

The unique reel

Turning now to FIGURES 4 and 5, the reel 30 comprises a plurality, in this instance 4, cutting blades 32, and each blade is longitudinally curved to extend spirally adjacent the surface of the cylinder and partially around a coaxial mounting and drive shaft 36. Embracing the drive shaft 36 and extending radially therefrom are the web members 34 on which the blades 32 are mounted. These are suitably made of plate stock and include, as best shown in FIGURE 5, radially outwardly projecting support arms 126, radiating from a central hub section 128. At the extremity of each arm 126 there is provided a weldment or attachment pad 130, the pads of the spaced web members 34 being oriented relative to the shaft to positively embrace each cutting blade 32 at points along the length thereof.

Note that each blade makes about one-fourth (¼) turn in its length; and within the full scope of invention, this may be in a range of about one-eighth (⅛) to one-third (⅓) turn, a commensurate adjustment in the number of blades 32 being made to proivde substantially a constant cutting action. It could well be pointed out at this time that the disposition of the flat sides of the blade of the usual reel-type mower is truly radial. In contrast, as best observed from FIGURE 5, the cutting blade of the invention is of polygonal or, more specifically trapezoidal transverse cross-section that is canted to form a substantial, acute angle between a center line of the blade and a radial line running through the axis of the reel and the front edge of the cutting surface as indicated by the angle "a." The outer side or cutting surface, designated 132 in FIGURE 5, is therefore ground at a complementary acute angle "b" to the same center line of the blade. Thus, these outer sides 132 of the blades are disposed along spiral paths on the cylinder of revolution generated thereby, and the leading faces of the blades extend inwardly from spiral lines of intersection with the outer sides, which spiral lines define the aforementioned leading and foliage-cutting knife edges. As is evident from FIGURE 5, the curved leading face of each blade, over the length thereof, is inclined at the same aforementioned, substantial, acute angle "a" to radial lines passing from the aforementioned cutting edge through the axis of the reel shaft 36; and this angular disposition is in a direction opposite to the normal direction of movement of the blade about the reel shaft. As a result, the leading face and outer side of each blade intersect at the leading cutting edge with the same, aforementioned, acute angle "b" to give the leading cutting edge its knife edge configuration. The reel being located, as described, at a forward station on the mower frame with the blades at the front of the reel and from end-to-end of the reel being exposed and unobstructed by other mower parts during their forward and downward travel (FIGURE 6), the leading, cutting edges of the blades will engage and cut all foliage with a shearing action at a level (point 138 in FIGURE 6) above the axis of the reel.

The cant of the cutting blade is productive of a sharp corner 134 in the profile of the blade that defines a sharp knife edge for severing foliage at a high level with an action like that of a sickle, i.e., without benefit of a cutter bar. Thus, as shown in FIGURE 6, the leading knife edge at the point 134 on the outer side 132 contacts the stems 136 along an upper medial portion of their height at an initial contact point 138 at which the first cut is taken on very tall grass or the like, cutting off the upper part thereof. Continuing to refer to FIGURE 6, it can be seen that the point 134 on the blade moves on downwardly along the arc 140 while the mower as a whole is moving forwardly, gathering the bottom part of stem 136 in behind it and moving it toward the cutter bar in the relative direction of the arrow line 142. This catches the grass between the blade of the reel and the leading edge of the cutter bar where the second and final shearing cut is taken in a conventional manner. Referring to FIGURE 5, this final shearing action would effectively be at the point 144, representing the line of engagement between the outer side 132 of the blade and the forward cutting edge of the cutter bar, this leading edge of the cutter bar being oriented parallel to the reel shaft below the reel and substantially on the cylinder of revolution generated by the outer sides 132 of the reel blades upon rotation of the reel for foliage-shearing coaction of the blades and cutter bar.

Referring now to FIGURE 4, a plurality of longitudinally spaced notches 144 are formed into the outer side 132 of each blade, the notches being canted to extend along a spiral represented by the phantom line 146. Thus they are not truly transverse to the outer side 132, but are canted at an acute angle "c" to a truly transverse line 148 across the outer side 132 in a direction to align them more nearly with the stems of foliage tilted laterally away from the vertical by engagement with a blade as a result of the spiral configuration of the blades engaging the same. It will be noted that during rotation of the reel, the natural spiral of the blades and cutting edges will be such as to push foliage sideways in the direction of the arrow 150, as by movement in that direction of a plane extending along the line 152. Accordingly, without benefit of an opposing action developed by the grooves 144 aligned in the plane 146, the reel will have a natural tendency to force the foliage to slide along the blades to the right in the arrow direction 150, whereby it will tend to be pressed down prior to engagement by the cutter bar and be passed over by the cutter bar, leaving it uncut. However, by virtue of the opposing action of the notches 144, which engage foliage sliding along the blades, the natural knock-down action due to the spiral of the blades of the reel is counteracted to provide a foliage supporting action whereby the foliage is forced circumferentially about the cylinder in which the reel operates. Thus the high level cutting action becomes effective without knocking the stems sideways; and then the reel gathers the remainder of the foliage straight into the cutter bar for the second or final trim cut.

This novel, dual cutting action is brought about without sidewise knock-down by a combination of factors as follows:

(1) The cant of the plane of the cutting blade to the radius as best shown in FIGURE 5;

(2) The opposing cant of the notches 144 in the so-canted cutting edge as shown, in FIGURE 6; and (3) The sharp knife edge at the blade corner 134 that leads the cutting blade into the standing foliage to perform a high level cut, as shown in FIGURE 6, followed by the gentle gathering or sweeping action of the rotation of the reel in catching grass between the reel blades and the cutter bar for the low level cut.

*The blade safety guard*

As shown in FIGURE 7, a blade guard 154 is mounted at the front of the machine for pivoting between a guarding position in front of the reel 30; and a non-guarding position tilted upwardly in front of the engine 56. In the upper position, the guard leaves the reel fully exposed for the dual cutting action necessary for felling tall standing grasses and weeds.

The blade guard is suitably formed of sheet stock and hinged at 156. The hinge 156 is fastened to the forward edge of the top plate 54 of the frame 12 of the mower. A short arcuate surface 158 extends from the hinge to the reverse curved flat 160; thence extending outwardly in an arcuate portion 162.

As will be observed from FIGURE 7, the blade guard is pivoted forwardly into a guarding position overlying in cleared relation the reel 30. This is the position of the guard when the mower is used to cut relatively short lawn grasses in order to keep any person or thing which the reel might encounter from either being damaged or damaging the reel. This is particularly helpful to prevent small children from being injured who might be playing on a lawn where the mower is being operated.

However, when cutting high standing materials and it is desired to have the preliminary cutting action high up on the stalk or stem of the plant, the guard 154 can be hinged upwardly and out of the way. This is shown in the dotted outline position of FIGURE 7. For purposes of holding the blade guard upwardly, an eye 164 and hook 166 are suitably employed as illustrated.

An additional note should be made at this point relative to the notches 144 of cutting edges 132. These are staggered from blade to blade so that if one notch embraces a plant stem and fails to sever it, the following blade will cut at that same point along the length of the reel. Suitably the notches are staggered less than the distance or spacing between notches.

What is claimed is:

1. In a reel-type mower,
a stationary cutter bar,
a cylindrical reel having a blade lying in a spiral path oriented axially along the surface of the reel,
the blade having a cutting edge movable along the cylinder operating surface of the reel,
the blade positioned in a first plane disposed at an acute angle relative to a radial line passing through the axis of the reel and contacting the forward portion of the cutting edge,
said cutting edge having a cutting surface lying in a second plane forming with the first plane another acute angle which is substantially complementary to the other acute angle,
the cutter bar being oriented parallel to the axis of the reel and disposed to coact with the blade cutting edge in a shear action as the cutting edge is moved in contiguous reaction therepast,
the spiral nature of the blade producing a natural tendency during operation to urge encountered foliage along the axis of the reel in the direction of the spiral,
a plurality of spaced notches formed along the cutting edge to frictionally engage the stems of the foliage to be cut, and said notches so oriented with respect to said cutting edge of the blade as to so urge encountered foliage to the natural spiral of the reel and thus retain the encountered foliage in an upright position.

2. In a reel-type mower, a wheel supported frame and a reel mounted upon said frame for rotation about a horizontal axis, said reel comprising a coaxial, rotatable shaft and a plurality of cutting blades equally spaced from and disposed about said shaft and having outer sides that generate a cylinder of revolution upon rotation of the shaft, and a stationary cutter bar having a leading edge oriented parallel to said shaft substantially on said cylinder revolution below the reel for shearing coaction with said blades upon rotation of the reel to cut foliage at a low level, and said blades being longitudinally curved to dispose said outer sides thereof along spiral paths on said cylinder of revolution; the improvement wherein each of said blades has a leading face extending inwardly from said cylinder of revolution from a leading cutting-edge of the blade defined by a spiral line of intersection of said outer side and said leading face, and said leading face, over the length thereof, being inclined at a substantial, acute angle (angle $a$ in FIGURE 5) with respect to radial lines passing from said cutting edge through the axis of said shaft, and said angular disposition of said leading face being in a direction opposite to the normal direction of movement of the blade about said shaft, whereby said leading face and outer side intersect at said leading cutting edge with an acute angle (angle $b$ in FIGURE 5) to give said cutting edge a knife-edge configuration; said reel being located at a forward station on said frame with the leading cutting edges of said blades at the front of the reel and from end-to-end of the reel being exposed and unobstructed by other mower parts during their forward and downward travel for directly engaging and cutting tall foliage with a shearing action at a level above the axis of the reel.

3. In an improved reel-type mower according to claim 2, said outer side of each blade having a plurality of foliage-supporting notches for engaging foliage and counteracting the natural knock-down action due to the spiral of the blades of the reel.

4. In an improved reel-type mower according to claim 2, said outer side of each blade having a plurality of foliage-supporting notches for engaging foliage and counteracting the natural knock-down action due to the spiral of the blades of the reel, said notches extending into the outer side of each blade along lines that are canted at a substantial angle (angle $c$ in FIGURE 4) to truly transverse lines across the outer side of that blade, said cant being in a direction to align said notches more nearly with the stems of foliage tilted laterally away from the vertical by engagement with a blade as a result of the spiral configuration of the blades engaging the same.

References Cited by the Examiner
UNITED STATES PATENTS

| | | | |
|---|---|---|---|
| 2,056,369 | 10/36 | Roessel | 56—294 |
| 2,112,800 | 3/38 | Worssam | 56—294 |
| 2,538,359 | 1/51 | Ferrell | 56—294 |

T. GRAHAM CRAVER, *Primary Examiner.*

ANTONIO F. GUIDA, *Examiner.*

UNITED STATES PATENT OFFICE
CERTIFICATE OF CORRECTION

Patent No. 3,181,289                                                            May 4, 1965

Sylvester Patt

It is hereby certified that error appears in the above numbered patent requiring correction and that the said Letters Patent should read as corrected below.

Column 7, line 2, after "foliage" insert -- contra --.

Signed and sealed this 14th day of September 1965.

(SEAL)
Attest:

ERNEST W. SWIDER                                    EDWARD J. BRENNER
Attesting Officer                                         Commissioner of Patents